(12) United States Patent
Connolly

(10) Patent No.: US 8,708,738 B1
(45) Date of Patent: Apr. 29, 2014

(54) CABLE CONNECTOR

(71) Applicant: Michael C Connolly, Salisbury, MA (US)

(72) Inventor: Michael C Connolly, Salisbury, MA (US)

(*) Notice: Subject to any disclaimer, the term of this patent is extended or adjusted under 35 U.S.C. 154(b) by 84 days.

(21) Appl. No.: 13/623,280

(22) Filed: Sep. 20, 2012

(51) Int. Cl.
H01R 9/05 (2006.01)

(52) U.S. Cl.
USPC .......................................................... 439/580

(58) Field of Classification Search
USPC ............ 439/580–585, 63, 552, 460; 174/659, 174/653, 655, 59–62
See application file for complete search history.

(56) References Cited

U.S. PATENT DOCUMENTS

| | | | |
|---|---|---|---|
| 1,328,290 A | 1/1920 | Overbagh | |
| 2,000,850 A | 5/1935 | Knell | |
| 2,084,961 A | 6/1937 | Bondeson | |
| 2,097,695 A | 11/1937 | Kingdon | |
| 2,490,286 A | 12/1949 | Tornblom | |
| 2,552,149 A | 5/1951 | Clark et al. | |
| 3,788,582 A * | 1/1974 | Swanquist | 248/56 |
| 4,265,420 A * | 5/1981 | McCormick | 248/56 |
| 4,652,018 A | 3/1987 | Boghosian | |
| 5,013,872 A | 5/1991 | Lockwood et al. | |
| 5,539,152 A * | 7/1996 | Gretz | 174/663 |
| 5,647,613 A * | 7/1997 | Marik et al. | 285/195 |
| 5,894,109 A * | 4/1999 | Marik | 174/650 |
| 6,064,009 A | 5/2000 | Jorgenson et al. | |
| 6,194,661 B1 | 2/2001 | Gretz | |
| 6,355,884 B1 | 3/2002 | Gretz | |
| 6,521,831 B1 | 2/2003 | Gretz | |
| 6,979,779 B2 | 12/2005 | Grady | |
| 7,723,623 B2 | 5/2010 | Kiely et al. | |
| 8,124,891 B1 | 2/2012 | Gretz | |

* cited by examiner

Primary Examiner — Jean F Duverne
(74) Attorney, Agent, or Firm — Altman & Martin; Steven K Martin

(57) ABSTRACT

A cable connector for four cables. The connector has a body, a pair of clamps, and a screw. The body has an attachment portion to attach to a cable carrier and a clamping portion extending upwardly from the attachment portion. The clamping portion widens into a generally rectangular cavity defined by opposed short walls and opposed tall walls. A divider between the tall walls bisects the cavity. The clamps are L-shaped with a clamping face and a foot. Cables are passed through the attachment portion and the cavity with two cables between one clamp and the divider and the other two cables between the second clamp and the divider. The screw fits into a hole in one clamp, through a hole in the divider, and into a threaded hole in the other clamp. The screw is tightened until the cables are held securely.

6 Claims, 6 Drawing Sheets

CABLE CONNECTOR

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to electrical cables, more particularly, to cable connectors for securing the ends of electrical cables and flexible metal conduits in electrical junction boxes, wireways, and the like.

2. Description of the Related Art

Electrical junction boxes are widely used to join electrical cables or to connect cables to fixtures and the like. Wireways are used to run cables throughout buildings. Junction boxes and wireways typically have knockouts formed in the walls so that the cable or conduit can pass through openings into the box or wireway. Cable connectors or clamp connnectors secure the ends of the cables in the openings such that the cables cannot be pulled from the opening. One basic form of cable connector retains the cable by clamping it between the outer wall of the connector and a screw-tightened clamping plate. The clamping plate may have protrusions to more securely clamp down on the cable or conduit.

The vast majority of cable connectors are designed to allow only one cable to pass through the opening. Some connectors are designed for two cables, with each cable passing through either the same box opening or two adjacent openings. The more cables that can be passed through a single opening, the more efficient the process of wiring can be.

BRIEF SUMMARY OF THE INVENTION

The present invention is a cable connector that separately clamps up to four electrical cables. The cable connector has a body, a pair of clamps, and a screw. The body has an attachment portion and a clamping portion extending along a longitudinal axis. The attachment portion attaches the body to a cable carrier, such as a junction box or conduit. It has a channel through which the cables and/or cable wires pass.

The clamping portion is where the electrical cables are secured to the cable connector. Extending upwardly from the attachment portion, the clamping portion widens into a rounded rectangular cavity contiguous with the channel. Opposed short walls extend upwardly a short distance and opposed tall walls extend further upward. The gaps between the edges of the tall walls provide space for the clamps. A divider extending between the tall walls bisects the cavity. Optionally, the divider includes a pair of linear ridges parallel to the longitudinal axis that define a pair of cable guides. The ridges also separate the cables from the screw.

The clamps are generally L-shaped in end view, with a clamping face and a foot. Each clamp has a through hole for the screw. The hole of one of the clamps is not threaded and the hole of the other clamp is threaded for the screw. Optionally, the clamping face is textured to aid in securing the cables.

To use the connector, the cables are passed through the cavity and channel such that two of the cables are between one clamp and the divider and the other two cables are between the other clamp and the divider. The screw is tightened until the cables are held securely.

Objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

Figure 1:
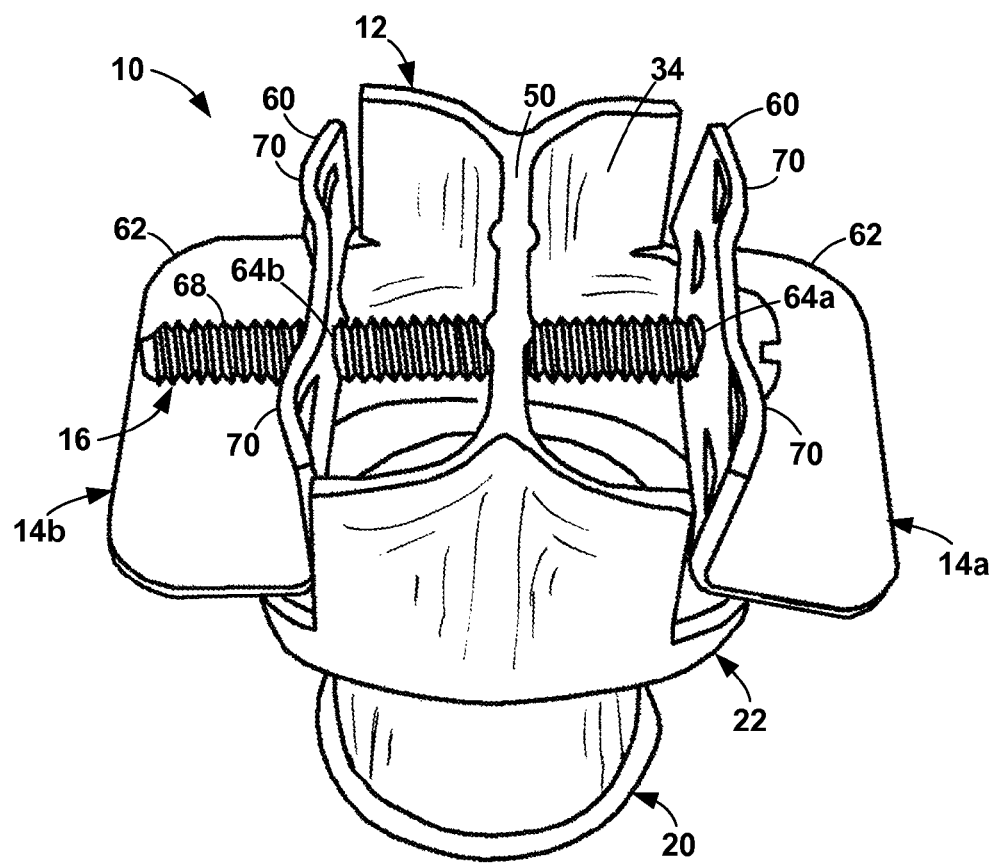
FIG. 1 is a top perspective view of the cable connector of the present invention.
Figure 2:
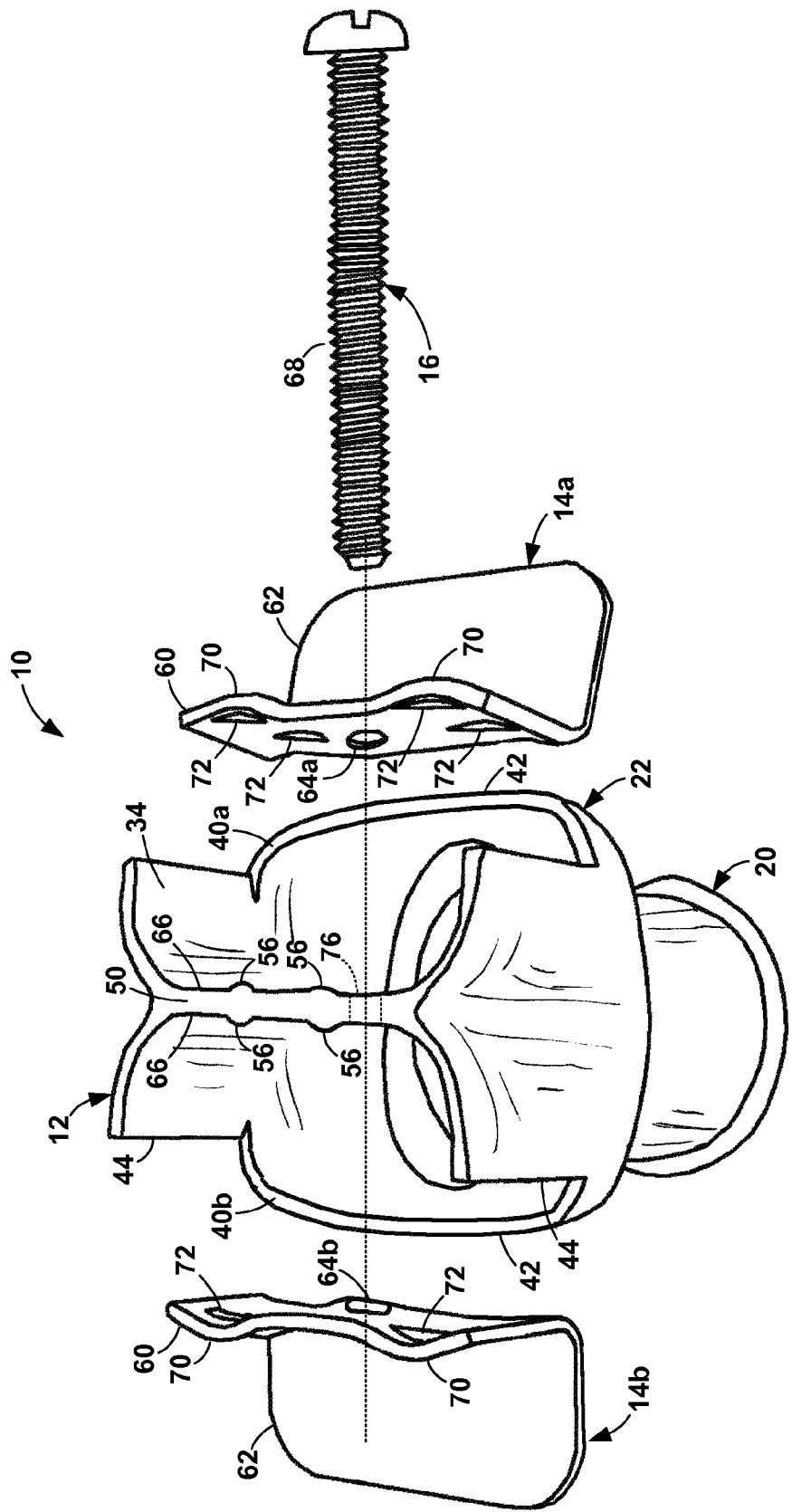
FIG. 2 is an exploded view of the cable connector of FIG. 1.
Figure 3:
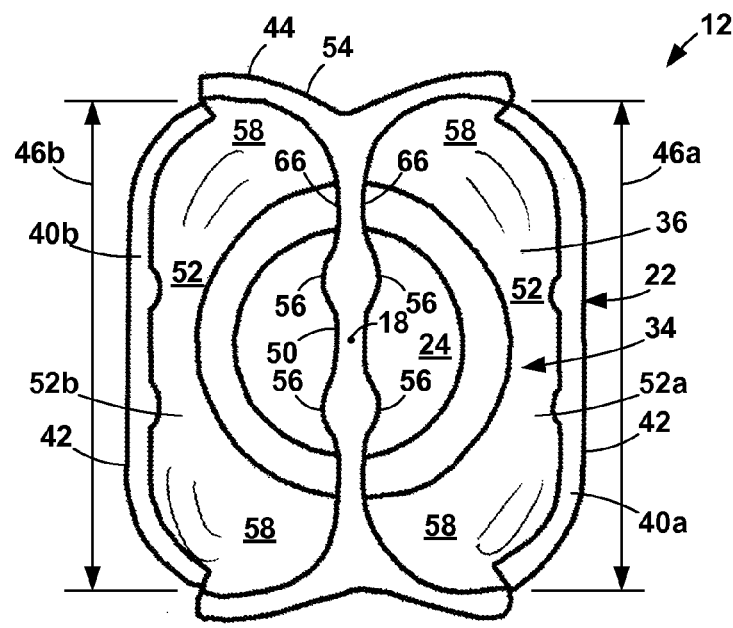
FIG. 3 is a top view of the body of the cable connector of FIG. 1.
Figure 4:
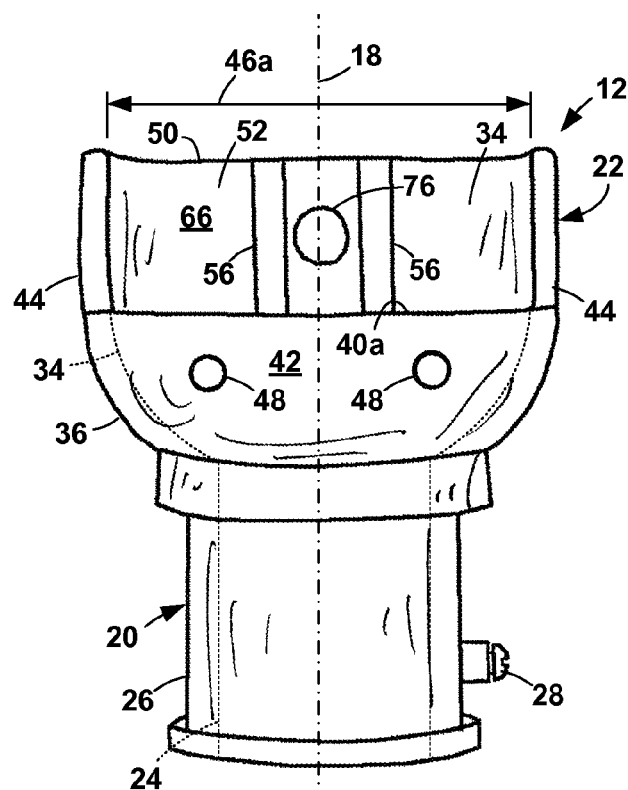
FIG. 4 is a front view of the body of the cable connector of FIG. 1.
Figure 5:
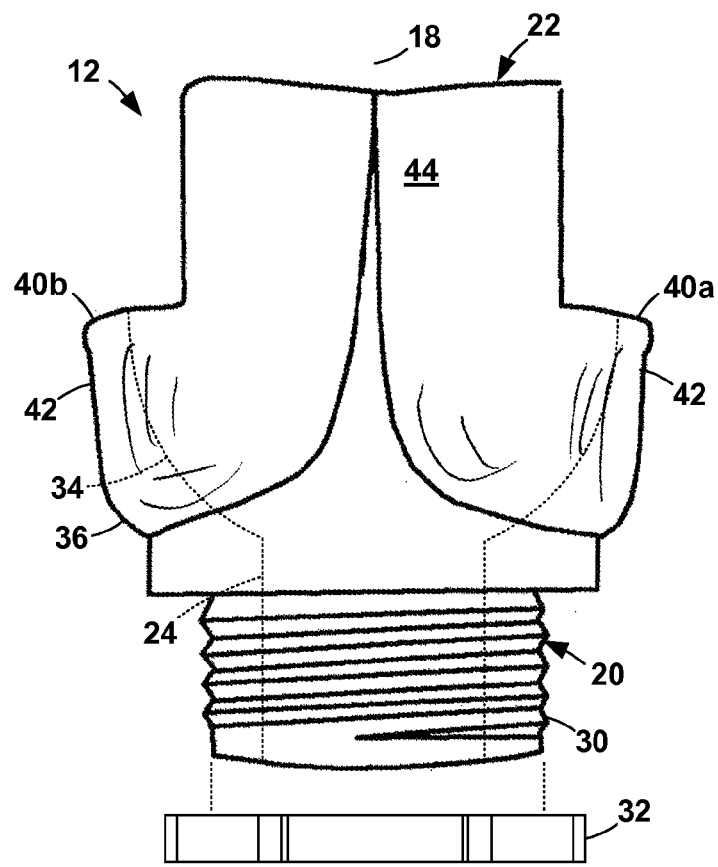
FIG. 5 is an end view of the body of the cable connector of FIG. 1.
Figure 6:
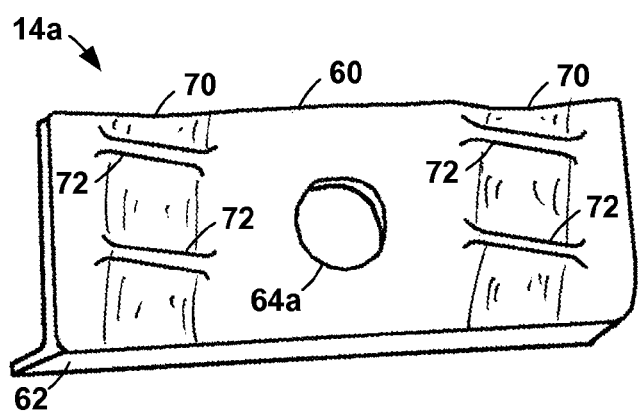
FIG. 6 is perspective view of the clamp of the cable connector of FIG. 1.

The present invention is a cable connector that separately clamps up to four electrical cables or flexible metal conduits extending through one electrical junction box or conduit opening. Electrical cables typically have an outer sheath of metal or plastic covering insulated conductors or wires. In the remainder of the present specification, references to electrical cables are intended to include flexible conduits and other constructions similar to cables and conduits used for the conduction of electricity.

The cable connector 10 of the present invention is shown in FIGS. 1-6. The connector 10 has a body 12, a pair of clamps 14a, 14b (collectively, 14), and a screw 16.

The body 12 has an attachment portion 20 and a clamping portion 22 extending along a longitudinal axis 18. The attachment portion 20 attaches the body 12 to a cable carrier, which can be any device that a cable extends through where a cable connector is needed to secure the cable. Examples include junction boxes, conduits, wireways, and the like. The present invention contemplates that the attachment portion 20 is the same as any of those of the prior art and that any attachment and variations found in the prior art and any new attachments that become known can be designed into the cable connector 10 of the present invention.

Two example attachment portions are shown. In the first example, shown in FIG. 4, a collar 26 and setscrew 28 are used to attach the body 12 to the end of a rigid conduit. In another example, shown in FIG. 5, a threaded insert 30 and a nut 32 are used to attach the body 12 to a junction box or the like through a knockout hole. Both the collar 26 and the threaded insert 30 have a channel 24 generally coaxial with the longitudinal axis 18 through which the electrical cables 2 and/or wires 4 can extend.

The clamping portion 22 is where the electrical cables 2 are secured to the cable connector 10. Extending upwardly from the attachment portion 20, the clamping portion 22 widens, as at 36. The interior of the clamping portion 22 is a generally rounded rectangular cavity 34 generally coaxial with the longitudinal axis 18, as viewed from the top in FIG. 3, and contiguous with the channel 24. Opposed short walls 42 extend upwardly only a short distance, whereas opposed tall walls 44 extend further upward. The gaps 46a, 46b (collectively, 46) between the edges of the tall walls 44 provide space for the clamps 14, as described below. The top edges 40a, 40b (collectively, 40) of the short walls 42 provide surfaces which act to orient the clamps 14, as described below.

A divider 50 extending between the center of the tall walls 44 bisects the cavity 34 into two generally equal-size sections 52a, 52b (collectively, 52). Optionally, the tall walls 44 curve outwardly, as at 54, from the divider 50. The divider 50 has an unthreaded through hole 76 for the screw, as described below.

Optionally, the divider 50 includes a pair of linear ridges 56 on each side 66 of the divider 50. The ridges 56 are generally parallel to the longitudinal axis 18 and bracket the divider hole 76. The ridges 56 define a pair of cable guides 58 within each section 52. When the cable 2 is clamped into the connector 10, the shape of the body 12 causes the cable 2 to be retained in the cable guide 58 between the tall wall 44 and the ridge 56. The ridge 56 also separates the cable 2 from the screw 16 so that the screw 16 does not damage the cable 2.

The clamps 14 are generally L-shaped in end view, with a clamping face 60 and a foot 62 extending approximately 90° from a long edge of the face 60. Each clamp 14 has a through hole 64a, 64b (collectively, 64) for the screw 16. The hole 64a in one of the clamps 14a is not threaded and is larger than the threaded portion 68 of the screw 16 so that the screw 16 slides easily through the hole 64a. The hole 64b in the other clamp 14b is threaded so that the screw 16 turns in the threads of the hole 64b.

Optionally, the clamping face 60 includes texturing that aids in securing the cables. In the present configuration, the texturing includes forming a cylindrical hollow 70 with a pair of diagonal linear protrusions 72. The present invention contemplates any form of texturing that aids in securing the cable.

The clamps 14 are attached to the clamping portion 22 by the screw 16. The screw 16 extends through the unthreaded hole 64a of one clamp 14a, through the unthreaded hole 76 in the divider 50, and turns into the threaded hole 64b of the other clamp 14b.

Alternatively, rather than have one clamp with an unthreaded hole and another clamp with a threaded hole, both clamps have unthreaded holes, and the screw is secured by a nut that is either separate from or attached to the clamp.

The body 12 and clamps 14 are made from generally rigid material that is typically electrically conductive. Contemplated materials include steel and other iron alloys, aluminum and aluminum alloys, and zinc and zinc alloys. The body 12 is typically formed by casting, but any other appropriate method can be used. The clamps 14 are typically formed by stamping, but any other appropriate method can be used.

The cable connector 10 of the present invention can be made in a variety of sizes, depending on the intended application. For example, the setscrew attachment can be made for different size rigid conduits, the threaded attachment can be made for different size junction box knockouts. The clamping portion 22 can be made for different size cables. Optionally, one section 52a and clamp 14a can be made for one size cable and the other section 52b and clamp 14b can be made for another size cable.

Figure 7:
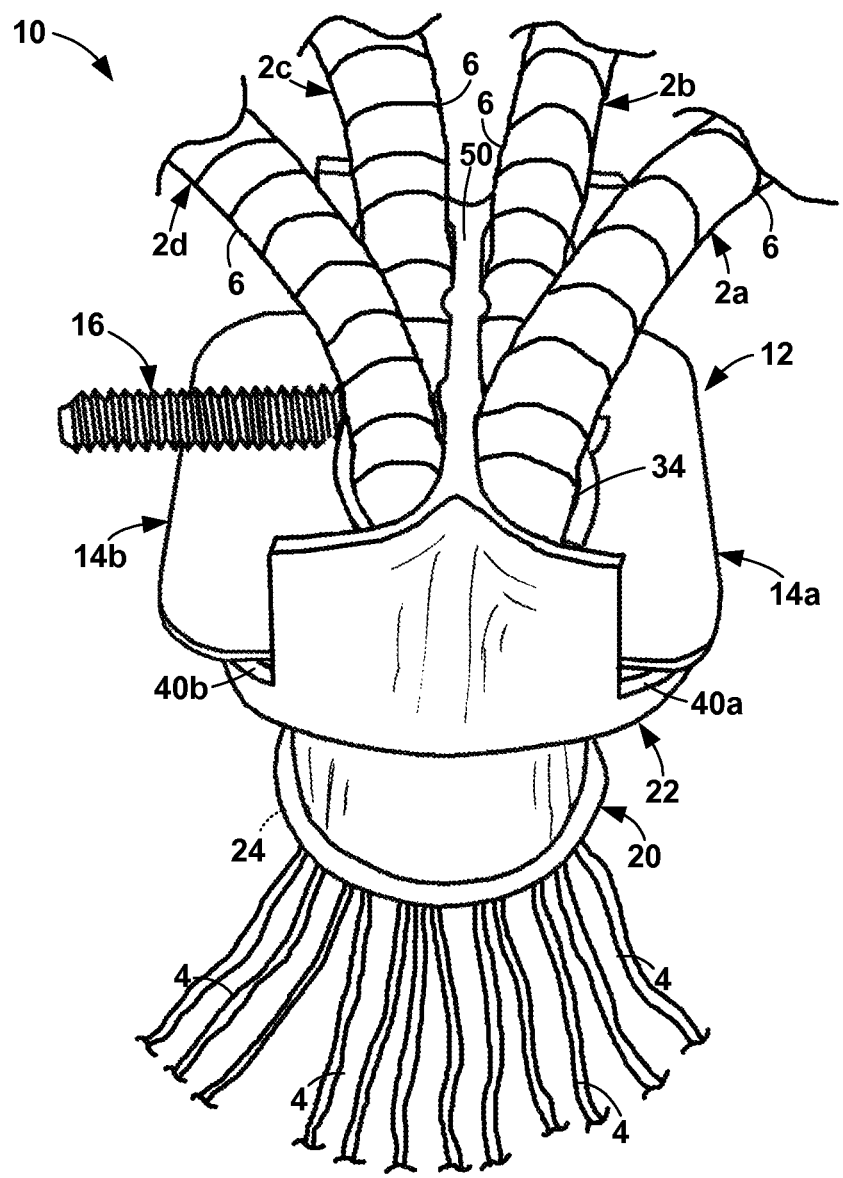
FIG. 7 is a perspective view of one way the connector of the present invention as used.
Figure 8:
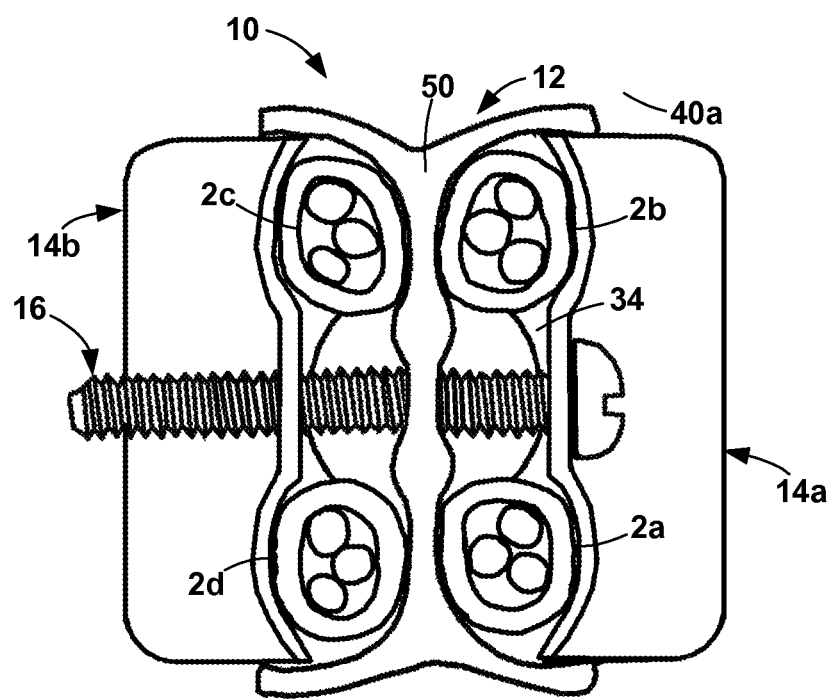
FIG. 8 is a top view of FIG. 7.

The cable connector 10 of the present invention is for use with up to four cables 2a, 2b, 2c, 2d (collectively, 2), as shown in FIGS. 7 and 8. Initially, the clamps 14a, 14b are loosely attached to the body 12. If the connector 10 is not assembled when purchased, the first clamp 14a is placed in the gap 46a with the foot 62 on the first short wall top edge 40a. The screw 16 is put through the unthreaded hole 64a and through the unthreaded hole 76 in the divider. The second clamp 14b is placed in the gap 46b with the foot 62 on the second short wall top edge 40b and the screw 16 is threaded into the threaded hole 64b.

The cables 2 are passed through the cavity 34 and the channel 24. Typically, the cable sheath 6 is stripped back or terminated such that the sheath 6 ends just below the short wall top edges 40. Peep holes 48 allow the installer to see just where the sheath 6 ends. The wires 4 exposed by terminating the sheath 6 extend from the channel 24, as in FIG. 7. As shown in FIG. 8, two of the cables 2a, 2b are located between the first clamp 14a and one side of the divider 50 with the screw 16 between them and the other two cables 2c, 2d are located between the second clamp 14b and the other side of the divider 50 with the screw 16 between them. The screw 16 is tightened until the cables 2 are held securely in the cable connector 10. The clamp foot 62 slides along the short wall upper edge 40 to maintain the proper orientation of the clamp 14 in the gap 46.

The cable connector 10 is installed on the cable carrier. If used with a junction box, it is installed in a knockout hole. If used with a conduit, it is installed at the end of the conduit. When cable connector 10 is installed depends on the installer and on what the cable carrier is. In one scenario, cable connector 10 is installed prior to inserting cables 2 through it. In another scenario, cable connector 10 is installed after the cables 2 are inserted and secured by the clamps 14.

Thus it has been shown and described a cable connector. Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A cable connector for four electrical cables comprising:
   (a) a body composed of a generally rigid material and having a longitudinal axis, an attachment portion, and a clamping portion, said attachment portion adapted to attach to a cable carrier and having a channel generally coaxial with said longitudinal axis, said clamping portion including a cavity contiguous with said channel and generally coaxial with said longitudinal axis, said cavity being defined by opposed tall walls and opposed short walls, said cavity being bisected by a divider extending between said tall walls, said divider having a first side and a second side, said clamping portion having a gap above each of said short walls between said tall walls;
   (b) a first clamp and a second clamp, each of said clamps having a clamping face, a foot extending approximately 90° from one edge of said face, and a through hole in said face, said first clamp located in one of said gaps with said face toward said first side of said divider, and said second clamp located in the other of said gaps with said face toward said second side of said divider; and
   (c) a screw extending through said first clamp hole, through a screw hole in said divider, and into said second clamp hole, whereby, when said screw is turned, said clamp faces pull together toward said divider;
   (d) whereby, when in use, two of said cables are located between said first clamping face and said divider with said screw therebetween and the other two of said cables are located between said second clamping face and said divider with said screw therebetween.

2. The cable connector of claim 1 wherein said second clamp hole is threaded for said screw.

3. The cable connector of claim 1 further comprising two linear ridges on said first side of said divider generally parallel to said longitudinal axis and bracketing said divider hole, and two linear ridges on said second side of said divider generally parallel to said longitudinal axis and bracketing said divider hole.

4. The cable connector of claim 1 wherein said clamp faces are textured.

5. The cable connector of claim 1 wherein said body and clamps are electrically conductive.

6. A cable connector for four electrical cables comprising:
  (a) a body composed of a generally rigid, electrically conductive material and having a longitudinal axis, an attachment portion, and a clamping portion, said attachment portion adapted to attach to a cable carrier and having a channel generally coaxial with said longitudinal axis, said clamping portion including a cavity contiguous with said channel and generally coaxial with said longitudinal axis, said cavity being defined by opposed tall walls and opposed short walls, said cavity being bisected by a divider extending between said tall walls, said divider having a divider through hole, two linear ridges on a first side of said divider generally parallel to said longitudinal axis and bracketing said divider hole, and two linear ridges on a second side of said divider generally parallel to said longitudinal axis and bracketing said divider hole, said clamping portion having a gap above each of said short walls between said tall walls;
  (b) a first clamp and a second clamp, each of said clamps being electrically conductive and having a textured clamping face, a foot extending approximately 90° from one edge of said face, and a through hole in said face, said first clamp located in one of said gaps with said face toward said first side of said divider, and said second clamp located in the other of said gaps with said face toward said second side of said divider; and
  (c) a screw extending through said first clamp hole, through said divider hole, and into said second clamp hole, said second clamp hole being threaded, whereby, when said screw is turned into said threaded second clamp hole, said clamp faces pull together toward said divider;
  (d) whereby, when in use, two of said cables are located between said first clamping face and said divider with said screw therebetween and the other two of said cables are located between said second clamping face and said divider with said screw therebetween.

\* \* \* \* \*